(12) United States Patent
Wang et al.

(10) Patent No.: US 11,799,509 B2
(45) Date of Patent: Oct. 24, 2023

(54) DELAY-LINE BASED TRANSCEIVER CALIBRATION

(71) Applicant: ZEKU TECHNOLOGY (SHANGHAI) CORP. LTD., Shanghai (CN)

(72) Inventors: Bo Wang, San Diego, CA (US); Wei Zhuo, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 0 days.

(21) Appl. No.: 17/940,978

(22) Filed: Sep. 8, 2022

(65) Prior Publication Data

US 2023/0006709 A1 Jan. 5, 2023

Related U.S. Application Data

(63) Continuation of application No. PCT/US2021/020953, filed on Mar. 4, 2021.
(Continued)

(51) Int. Cl.
*H04B 1/40* (2015.01)
*H04B 1/04* (2006.01)
*H04B 1/12* (2006.01)

(52) U.S. Cl.
CPC ............ *H04B 1/40* (2013.01); *H04B 1/0475* (2013.01); *H04B 1/123* (2013.01)

(58) Field of Classification Search
USPC ................... 375/219–222, 354, 356
See application file for complete search history.

(56) References Cited

U.S. PATENT DOCUMENTS 3,328,565 A * 6/1967 Prichodjko .............. G01S 1/02
  342/453
6,657,536 B1 * 12/2003 Avenel ..................... G07C 9/28
  340/5.63
(Continued)

FOREIGN PATENT DOCUMENTS

CN  1230311 A  9/1999
CN  1335939 A  2/2002
(Continued)

OTHER PUBLICATIONS

First Office Action issued in corresponding Chinese application No. 202180020223.2, dated Apr. 27, 2023.
(Continued)

*Primary Examiner* — Emmanuel Bayard
(74) *Attorney, Agent, or Firm* — BAYES PLLC

(57) ABSTRACT

Embodiments of apparatus and method for calibration of a transceiver (including a transmitter and a receiver) are disclosed. In an example, a method for transmitter quadrature (or IQ) mismatch and receiver quadrature (or IQ) mismatch calibration can include controlling the transmitter to send a first transmit signal to the receiver with a delay between an output of the transmitter and an input of the receiver. The method can also include controlling the transmitter to send a second transmit signal to the receiver without the delay between the output of the transmitter and the input of the receiver. The method can further include obtaining compensation coefficients of the transceiver based on the sending of the first transmit signal and the sending of the second transmit signal.

20 Claims, 7 Drawing Sheets

Related U.S. Application Data

(60) Provisional application No. 62/987,688, filed on Mar. 10, 2020.

(56) References Cited

U.S. PATENT DOCUMENTS

| | | | |
|---|---|---|---|
| 10,014,963 B2 * | 7/2018 | Su | H04B 17/12 |
| 10,063,365 B1 * | 8/2018 | Ribo | H03L 7/07 |
| 2009/0046003 A1 | 2/2009 | Tung et al. | |
| 2013/0151171 A1 * | 6/2013 | Mizota | G01N 29/24 |
| | | | 73/632 |
| 2014/0242914 A1 * | 8/2014 | Monroe | H04B 17/21 |
| | | | 455/63.4 |
| 2014/0370823 A1 | 12/2014 | Yu | |
| 2016/0080896 A1 | 3/2016 | Song et al. | |
| 2016/0261303 A1 * | 9/2016 | Hsu | H04B 17/104 |
| 2016/0329631 A1 | 11/2016 | Tobias et al. | |
| 2016/0359614 A1 | 12/2016 | Hao et al. | |
| 2017/0093512 A1 * | 3/2017 | Zhu | H04L 1/20 |
| 2017/0222739 A1 | 8/2017 | Su et al. | |
| 2017/0288790 A1 | 10/2017 | Haub et al. | |
| 2019/0356366 A1 * | 11/2019 | van Meurs | H04W 56/0015 |

FOREIGN PATENT DOCUMENTS

| | | |
|---|---|---|
| CN | 1477834 A | 2/2004 |
| CN | 102221816 A | 10/2011 |
| CN | 102377727 A | 3/2012 |
| CN | 103188696 A | 7/2013 |
| CN | 105075140 A | 11/2015 |
| CN | 106068464 A | 11/2016 |
| CN | 106256098 A | 12/2016 |
| CN | 106559160 A | 4/2017 |
| CN | 108462663 A | 8/2018 |
| CN | 108512802 A | 9/2018 |
| EP | 1058214 A1 * | 12/2000 ......... G07C 9/00111 |

OTHER PUBLICATIONS

Li Jianbo, "Buoy Underwater Acoustic Transceiver Hardware Design", Publisher: China Master's Theses Full-text Database, Release Date: Jun. 15, 2016

Nicolae C. Pampu et al., "Transfer Entropy as a tool for reconstructing interaction delays in neural signals", Published In: International Symposium on Signals, Circuits and Systems ISSCS2013, Date of Conference: Jul. 11-12, 2013.

International Search Report issued in International application No. PCT/US2021/020953, dated Jun. 15, 2021.

Written Opinion of the International Searching Authority issued in International application No. PCT/US2021/020953, dated Jun. 15, 2021.

Lauri Anttila et al., "Frequency-Selective I/Q Mismatch Calibration of Wideband Direct-Conversion Transmitters", IEEE Transactions On Circuits and Systems—II: Express Briefs, vol. 55, No. 4, Apr. 2008, pp. 359-363.

* cited by examiner

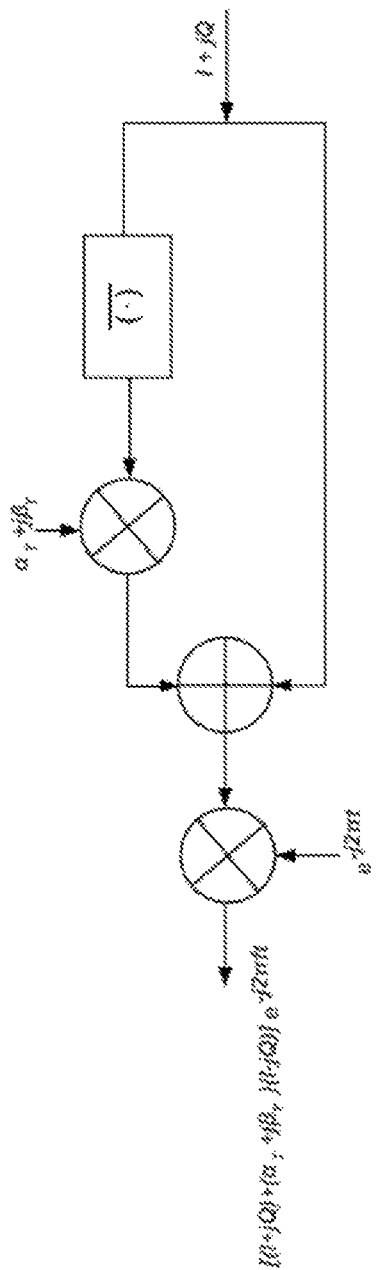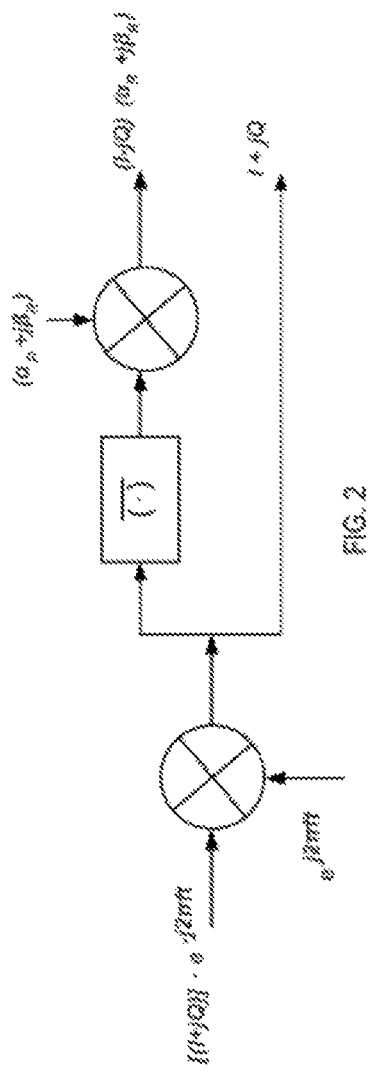

DELAY-LINE BASED TRANSCEIVER CALIBRATION

CROSS-REFERENCE TO RELATED APPLICATION

This application is a continuation of International Application No. PCT/US2021/020953 filed on Mar. 4, 2021, entitled "DELAY-LINE BASED TRANSCEIVER CALIBRATION", which claims the benefit of priority to U.S. Provisional Application No. 62/987,688 filed on Mar. 10, 2020, entitled "RF DELAY-LINE BASED IQ MISMATCH CALIBRATION SCHEME FOR 4G/5G RF TRANSCEIVERS," both of which are hereby incorporated by reference in their entireties.

BACKGROUND

Embodiments of the present disclosure relate to apparatuses and methods for transceiver calibration.

Wireless communication systems are widely deployed to provide various telecommunication services such as telephony, video, data, messaging, and broadcasts. In wireless communications, there may be a need to calibrate transmitters and receivers. For example, transmitters and receivers may experience non-idealities due to mismatch in radio frequency characteristics.

SUMMARY

Embodiments of apparatus and method for transceiver calibration are disclosed herein.

For example, a method for calibrating a transceiver (the transceiver including a transmitter and a receiver) can include controlling the transmitter to send a first transmit signal to the receiver with a delay between an output of the transmitter and an input of the receiver. The method can also include controlling the transmitter to send a second transmit signal to the receiver without the delay between the output of the transmitter and the input of the receiver. The method can further include obtaining compensation coefficients of the transceiver based on the sending of the first transmit signal and the sending of the second transmit signal.

In another example, an apparatus for calibrating a transceiver (the transceiver including a transmitter and a receiver) can include at least one processor and at least one memory including computer program code. The at least one memory and the computer program code can be configured to, with the at least one processor, cause the apparatus at least to control the transmitter, to send a first transmit signal to the receiver with a delay between an output of the transmitter and an input of the receiver. The at least one memory and the computer program code can also be configured to, with the at least one processor, cause the apparatus at least to control the transmitter to send a second transmit signal to the receiver without the delay between the output of the transmitter and the input of the receiver. The at least one memory and the computer program code can further be configured to, with the at least one processor, cause the apparatus at least to obtain compensation coefficients of the transceiver based on the sending of the first transmit signal and the sending of the second transmit signal.

In yet another example, a non-transitory computer-readable medium can be encoded with instructions that, when executed in hardware, cause a device at least to perform a process for calibration of a transceiver. The transceiver can include a transmitter and a receiver. The process can include controlling the transmitter to send a first transmit signal to the receiver with a delay between an output of the transmitter and an input of the receiver. The process can also include controlling the transmitter to send a second transmit signal to the receiver without the delay between the output of the transmitter and the input of the receiver. The process can further include obtaining compensation coefficients of the transceiver based on the sending of the first transmit signal and the sending of the second transmit signal.

In a further example, a system for transceiver calibration can include a transmitter configured to generate a first signal and a second signal and a receiver configured to receive the first signal and the second signal. The system can also include a coefficient extractor configured to extract compensation coefficients based on the first signal and the second signal. The system can further include a compensator configured to compensate for quadrature mismatch based on the extracted compensation coefficients. The system can additionally include a delay line configured to introduce a delay between an output of the transmitter and an input of the receiver. The system can also include a switch configured to bypass the delay line selectively. The system can further include a controller configured to control the transmitter to transmit the first signal when the delay line is bypassed and to transmit the second signal when the delay line is not bypassed.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 1 illustrates a mathematical model for transmitter IQ mismatch.

FIG. 2 illustrates a mathematical model for receiver IQ mismatch.

Figure 3:
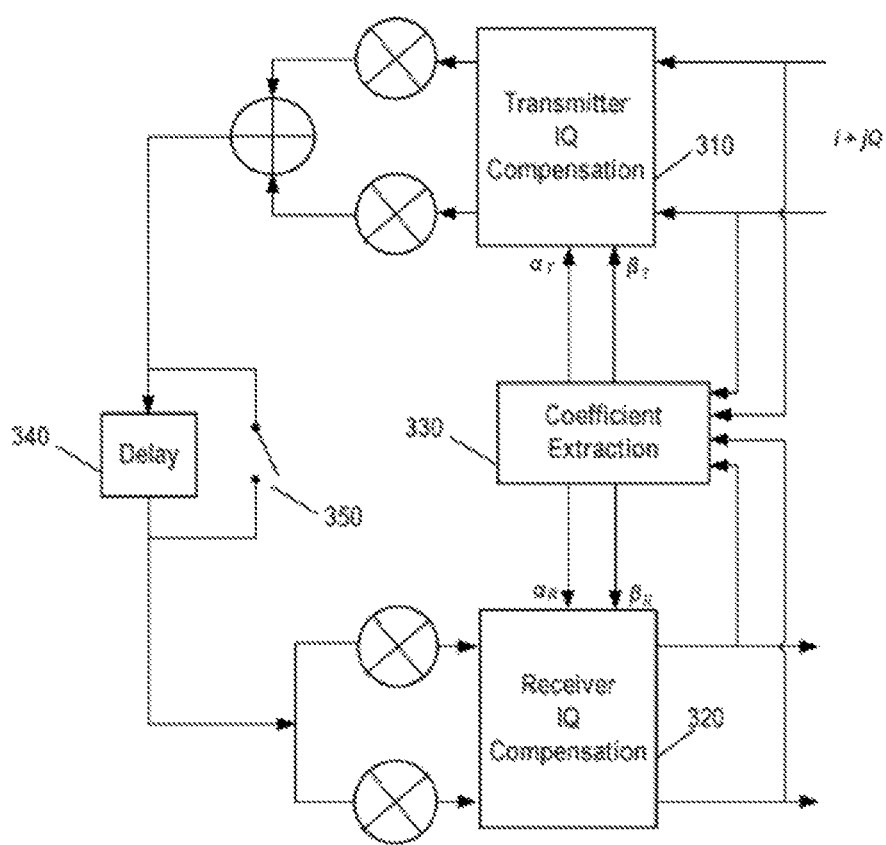
FIG. 3 illustrates an end-to-end system model, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), CDMA 2000, etc. A TDMA network may implement a RAT, such as Global System for Mobile communication (GSM). An OFDMA network may implement a RAT, such as Long-Term Evolution (LTE) or New Radio (NR). The techniques described herein may be used for the wireless networks and RATs mentioned above, as well as other wireless networks and RATs.

Transmitter IQ calibration can be performed in a variety of ways. An external equipment or an on-chip IQ-calibrated receiver is required for transmitter IQ calibration in some approaches. Likewise, an external signal generator or an on-chip signal generator is required for receiver IQ calibration in some approaches.

Some embodiments of the present disclosure rely on an on-chip un-calibrated transmitter auxiliary receiver (TAR) to calibrate the transmitter IQ mismatch during normal uplink traffic for a 5G NR sub-6 or LTE transceiver. It can also be used for the receiver IQ mismatch calibration during normal uplink traffic if the receiver is frequency tuned and functions as a TAR.

Some embodiments of the present disclosure may directly compute compensation coefficients and may thereby provide a highly efficient search approach to avoid an exhaustive search.

Some embodiments of the present disclosure may use hardware that can also serve another purpose, such as a TAR, for an extra purpose. Moreover, some embodiments may employ a closed-form mathematical solution that makes direct computation feasible. This approach may save calibration time. Calibration time reduction may be valuable for cellular transceivers or other transceivers that cover multiple frequency bands/channels and therefore rely on many calibrations.

Some embodiments of the present disclosure can be implemented in a radio frequency (RF) transceiver integrated circuit (IC) inside a cellphone, smart phone, or other user equipment. Some embodiments may be particularly useful for emerging fifth generation (5G) technology as the higher data throughput, and newly deployed frequency bands may benefit from tighter RF calibration tolerances and thus longer calibration time with other calibration schemes. A more time-efficient and more economical calibration scheme is a welcome feature for saving costs and improving performance for the cellphone manufacturers.

Some embodiments of the present disclosure utilize an RF delay-line or equivalent circuit (any equivalent circuit can be referred to as an RF delay line herein) to calibrate in-phase and quadrature (also referred to as IQ) mismatch, which is also known as residual-sideband (RSB), for either a transmitter or receiver.

A quadrature mixer in an RF transmitter or receiver can have IQ mismatches due to, for example, the gain and/or phase mismatches between the two paths, namely between the I path and the Q path.

FIG. 1 illustrates a mathematical model for transmitter IQ mismatch. FIG. 2 illustrates a mathematical model for receiver IQ mismatch.

The mathematic models for the end-to-end system demonstrate that if the transmitter output is connected with the receiver input, the same carrier frequency is applied, and the output of the receiver baseband is observed, the transmitter IQ mismatch and the receiver mismatch would be superposed on one another. Thus, superposition may prevent one from calibrating either the transmitter or the receiver. One can calibrate either the transmitter or the receiver first with additional equipment followed by the calibration of the other of the transmitter or the receiver.

Some embodiments, on the other hand, may use an RF delay-line, phase shifter, or other equivalent circuits. The RF delay line or phase shifter may have a deterministic but unknown value (for example, it is not necessary for the designer or user to know the precise value of the RF delay line or phase shifter). The use of the RF delay line or phase shifter can separate the transmitter IQ mismatch from the receiver mismatch if the baseband outputs are collected for both cases: a first case when the phase shifter is bypassed and a second place when the phase shifter in place. Either case can be first in time, and consequently, first and second here are just to distinguish the two cases.

By first extracting the combined IQ mismatches for the two cases and then solving suitable equations, the IQ mismatch coefficients can be extracted for both the transmitter and the receiver simultaneously and without the need for additional external equipment.

FIG. 3 illustrates an end-to-end system model, according to some embodiments of the present disclosure. As shown in FIG. 3, the system may receive an uncompensated transmitted signal I+jQ. The signal may undergo transmitter I/Q compensation at 310 and receiver I/Q compensation at 320.

Coefficient extraction at 330 may be performed with respect both to the transmitter signal and the receiver signal. An RF delay-line or phase shifter at 340 with a deterministic phase shift at the transmission frequency of the signal can be provided between transmitter I/Q compensation at 310 and receiver I/Q compensation at 320. The deterministic phase shift can be bypassed or in place with a bypass mechanism illustrated as switch 350.

Figure 4:
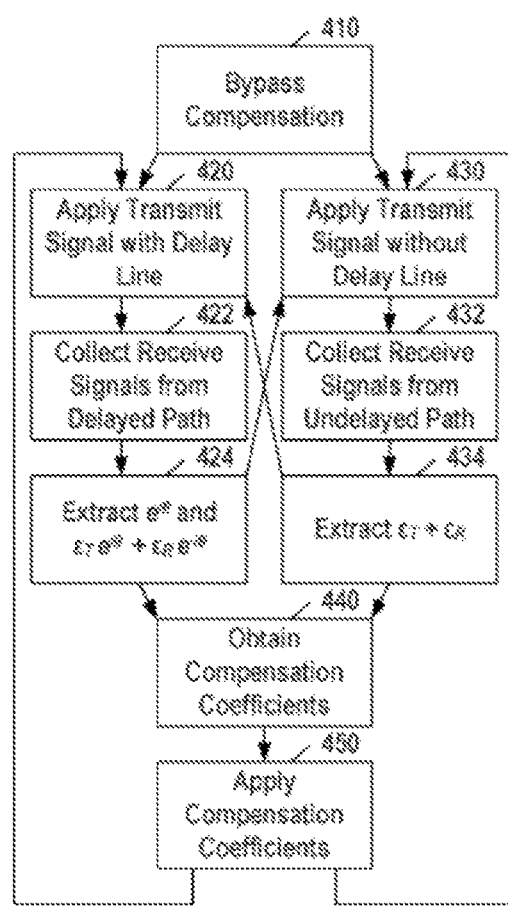
FIG. 4 illustrates a method according to some embodiments of the present disclosure.

FIG. 4 illustrates a method according to some embodiments of the present disclosure. The method illustrated in FIG. 4 may, for example, may be implemented by hardware (or hardware and software) corresponding to the model shown in FIG. 3 or any other desired hardware or combination of hardware and software.

As shown in FIG. 4, the method may begin by bypassing any existing compensation of IQ mismatch at 410. The method may then proceed by either applying a transmit signal with a delay line at 420 or applying a transmit signal without a delay line at 430. These are illustrated as parallel processes because either path may be followed first or second. The applying a transmit signal with a delay line at 420 or applying a transmit signal without a delay line at 430 can also be considered as controlling the transmitter to send a first transmit signal to the receiver with a delay between an output of the transmitter and an input of the receiver and controlling the transmitter to send a second transmit signal to the receiver without the delay between the output of the transmitter and the input of the receiver.

As shown in FIG. 4, after the transmission signal has been applied with a delay line at 420, receive signals can be collected from the delayed path at 422, and $e^{j\theta}$ and $\varepsilon_T e^{j\theta} + \varepsilon_R e^{-j\theta}$ can be extracted at 424. The receiver signal without the delay line may be $(I+jQ)e^{j\theta}+(I-jQ)(\varepsilon_T e^{j\theta}+\varepsilon_R e^{-j\theta})$. As I+jQ and I-jQ may be known, $e^{j\theta}$ and $\varepsilon_T e^{j\theta}+\varepsilon_R e^{-j\theta}$ can be computed. If this is the first of the two collections and extractions, the process can then proceed to apply the transmit signal with the delay line at 430. Otherwise, if applying the transmit signal with the delay line at 430 has already been performed, then the method may proceed to obtain compensation coefficients at 440.

Likewise, as also shown in FIG. 4, after the transmission signal has been applied without a delay line at 430, receive signals can be collected from the undelayed path at 432, and $\varepsilon_T+\varepsilon_R$ can be extracted at 434. The receiver signal without the delay line may be $(I+jQ)+(I-jQ)(\varepsilon_T+\varepsilon_R)$. As I+jQ and i-jQ may be known, $\varepsilon_T+\varepsilon_R$ can be computed. If this is the first of the two collections and extractions, the process can then proceed to apply the transmit signal without the delay line at 420. Otherwise, if applying the transmit signal without the delay line at 420 has already been performed, then the method may proceed to obtain compensation coefficients at 440.

Once the compensation coefficients have been obtained at 440, the compensation coefficients may be applied at 450. This may conclude the process. Optionally, however, the same process may be repeated with the newly applied compensation coefficients in place. Thus, the process may proceed to 420 or 430.

In both paths, whether starting at 420 or at 430, the same transmission signal may be applied by the transmitter, meaning a signal with the same characteristics. For example, if a coded pulse train is applied on one path, an identical coded pulse train may be applied to the other path.

In some embodiments, when the same process is repeated with the newly applied compensation coefficients in place, the result may be obtaining changes to the compensation coefficients of the system transceiver based on the sending the third transmit signal and the sending the fourth transmit signal. These changes may provide an incremental improvement to the newly applied compensation coefficients. While the process may be repeated many times, in practice one or two repetitions of the process may provide suitable compensation coefficients.

Some embodiments of the present disclosure may provide various benefits and/or advantages. The approach may provide time savings. A two-step data collection can be used to obtain both the transmitter compensation coefficients and the receiver ones simultaneously. Additionally, no pre-calibrated participant may be required. The approach may also provide cost savings. Neither external equipment nor an on-chip signal generator is required, but instead, only an RF delay-line, phase shifter, or equivalent circuit can be used. Furthermore, the components the RF delay-line, phase shifter, or equivalent circuit may not have demanding specifications with high precision known values or the like.

There may be other ways to provide calibration. For example, instead of the delay path, a non-linear loopback path may be sued. This approach may have the advantage that the receiver path may not require prior calibration. On the other hand, this approach may rely on non-linear terms generated by transmitter-receiver (T-R) loopback, which can also come from nonlinearity from transmitter or receiver and which can mask the wanted error signal and thus degrade calibration accuracy. As another example, receiver IQ mismatch can be calibrated using an on-chip tone generator. This approach may be accurate if a smart search algorithm for the coefficients is implanted and may be fast if a direct computation is applied. On the other hand, this approach may require more accurate and consequently expensive hardware and may only be used for receiver calibration.

Figure 5:
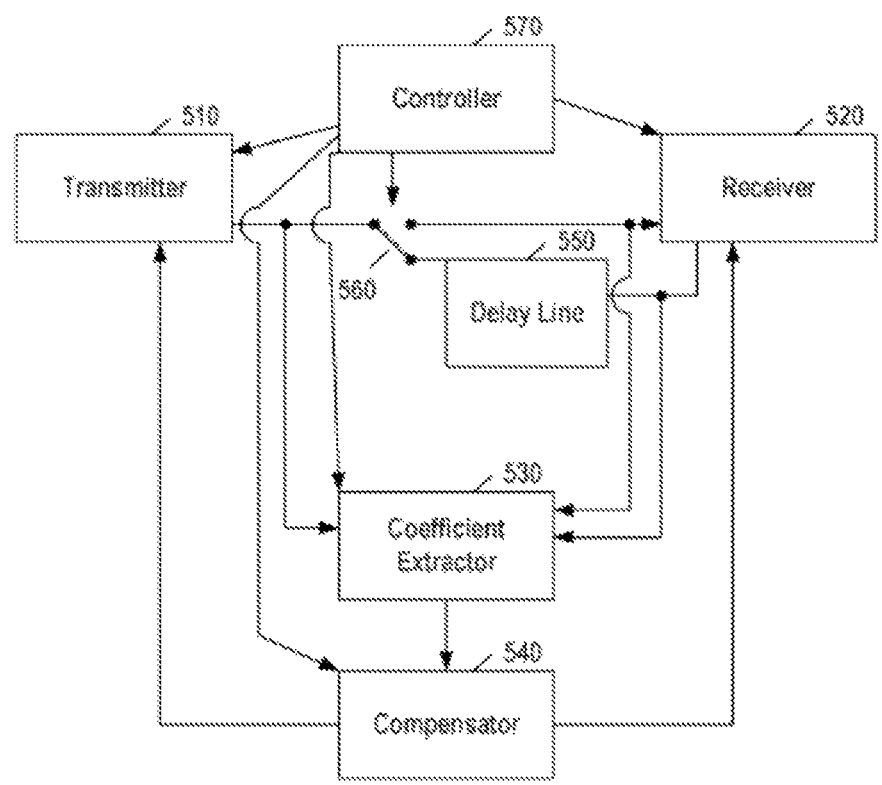
FIG. 5 illustrates a system for transceiver calibration, according to some embodiments of the present disclosure.

FIG. 5 illustrates a system for transceiver calibration, according to some embodiments of the present disclosure. As shown in FIG. 5, a transmitter 510 can be configured to generate a first signal and a second signal. The first signal and the second signal may have identical signal characteristics to one another when generated at the transmitter 510. The system may also include a receiver 520 configured to receive the first signal and the second signal. The system may further include a coefficient extractor 530 configured to extract compensation coefficients based on the first signal and the second signal. Thus, the coefficient extractor 530 is shown with taps into the line between the transmitter 510 and the receiver 520, including the branches of the line with and without the delay line 550.

The system can additionally include a compensator 540 configured to compensate for quadrature mismatch based on the extracted compensation coefficients. The compensator 540 may receive the compensation coefficients from the coefficient extractor 530.

The system can also include the delay line 550, which can be configured to introduce a delay between an output of the transmitter 510 and an input of the receiver 520. This delay line may be implemented by any desired circuit including a phase shifter, as mentioned above with reference to FIGS. 3 and 4.

The system can also include a switch 560 configured to bypass the delay line 550 selectively, thereby providing for a transmission line with and without the delay line 550, each of which can be tapped by the coefficient extractor 530, as mentioned above.

The system can further include a controller 570 configured to control the transmitter 510 to transmit the first signal when the delay line 550 is bypassed and to transmit the second signal when the delay line 550 is not bypassed. The controller 570 may also be configured to control the receiver 520, the switch 560, the coefficient extractor 530, and the compensator 540.

Although separately illustrated, the controller 570, coefficient extractor 530, and compensator 540 may be implemented by one or more computational devices, such as a microprocessor. The switch 560 is shown as a switch and may be implemented by a transistor or by any other desired mechanism for selecting a path for the signal to be transmitted between the transmitter and the receiver. For ease of understanding, the real and imaginary components are not shown separately in FIG. 5 but may be handled separated by the processing hardware and/or software used.

The coefficient extractor 530 and compensator 540 may each be implemented as one or more integrated circuit, such as an application-specific integrated circuit. Alternatively, the coefficient extractor 530 and compensator 540 may be implemented as software processes running on a general-purpose computer processor, such as a microcontroller unit (MCU). Other implementations are also permitted.

The receiver 520 may be a main receiver device of a user equipment, which may be configured to operate as a transmitter auxiliary receiver for calibration purposes or may be a special-purpose transmitter auxiliary receiver. Thus, for example, a user equipment may use the same receiver to receive signals from an access point or base station and to operate the method shown in FIG. 4 and the systems shown in FIGS. 3 and 5.

Figure 7:
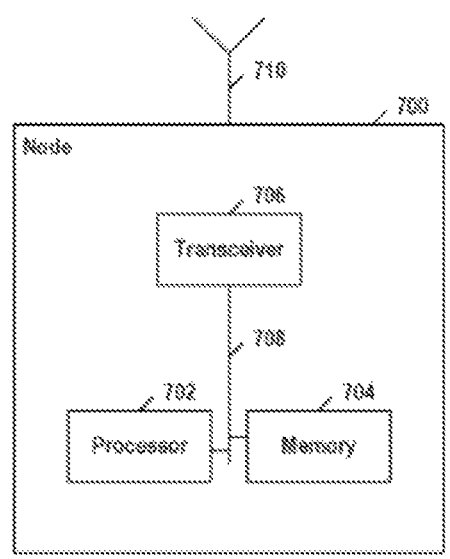
FIG. 7 illustrates an example node, in which some aspects of the present disclosure may be implemented, according to some embodiments of the present disclosure.
Figure 8:
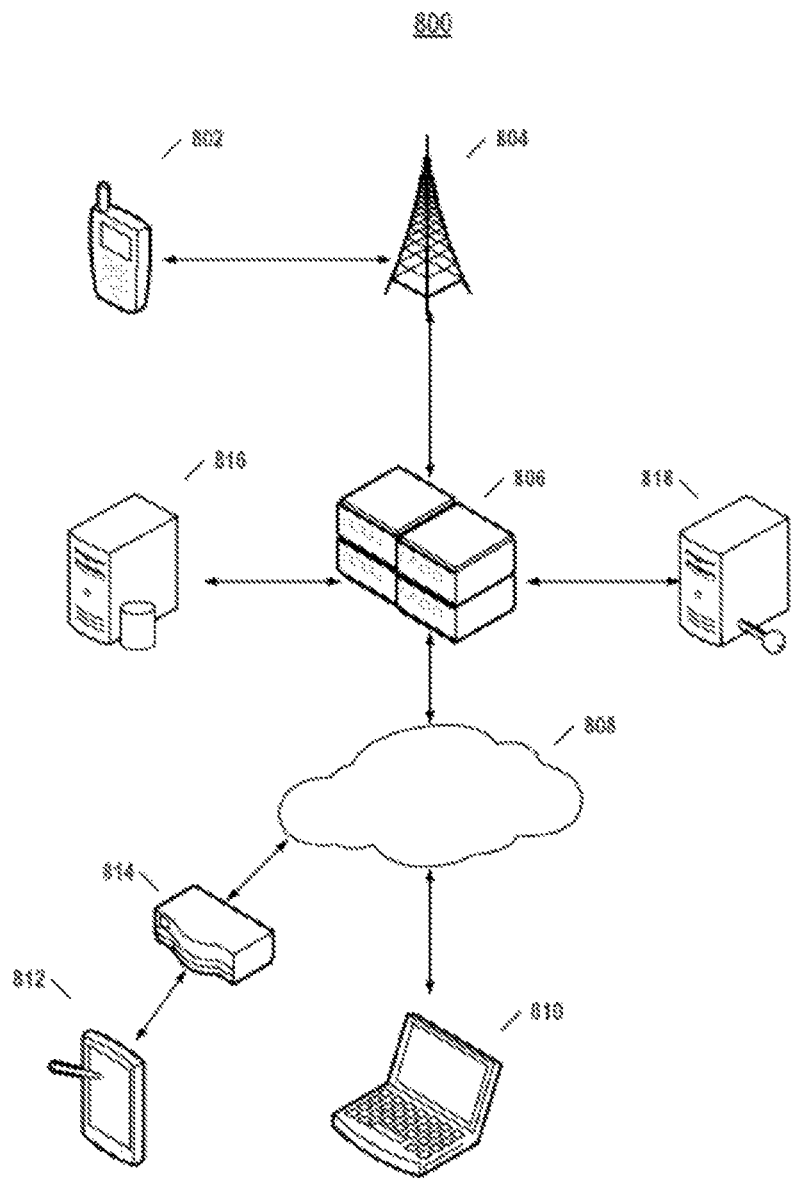
FIG. 8 illustrates an example wireless network, in which some aspects of the present disclosure may be implemented, according to some embodiments of the present disclosure.

The software and hardware methods and systems disclosed herein, such as the methods illustrated in FIG. 4 and the systems illustrated in FIGS. 3 and 5 may be implemented by any suitable nodes in a wireless network. For example, FIGS. 6 and 7 illustrate respective apparatuses 600 and 700, and FIG. 8 illustrates an exemplary wireless network 800, in which some aspects of the present disclosure may be implemented, according to some embodiments of the present disclosure.

Figure 6:
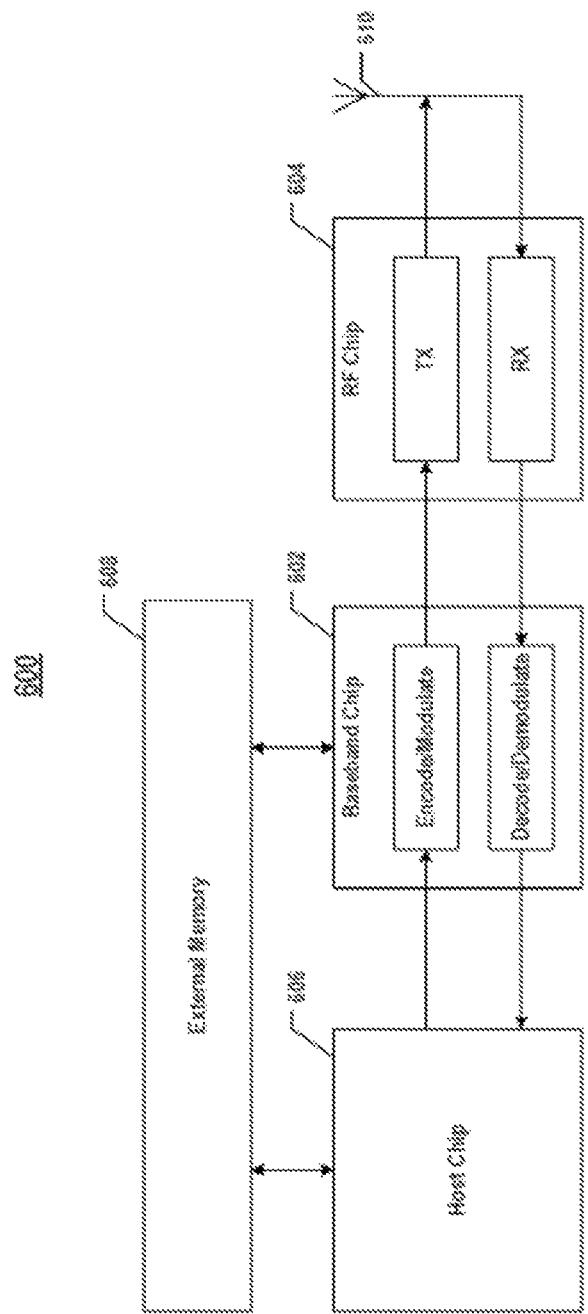
FIG. 6 illustrates a block diagram of an apparatus including a baseband chip, a radio frequency chip, and a host chip, according to some embodiments of the present disclosure.

FIG. 6 illustrates a block diagram of an apparatus 600 including a baseband chip 602, a radio frequency chip 604, and a host chip 606, according to some embodiments of the present disclosure. Apparatus 600 may be an example of any suitable node of wireless network 800 in FIG. 8, such as user equipment 802 or network node 804. As shown in FIG. 6, apparatus 600 may include baseband chip 602, radio frequency chip 604, host chip 606, and one or more antennas 610. In some embodiments, baseband chip 602 is implemented by processor 702 and memory 704, and radio frequency chip 604 is implemented by processor 702, memory 704, and transceiver 706, as described above with respect to FIG. 7. In some embodiments, radio frequency chip 604 may implement the method shown in FIG. 4, as well as the systems shown in FIGS. 3 and 5. Besides the on-chip memory (also known as "internal memory" or "local memory," e.g., registers, buffers, or caches) on each chip 602, 604, or 606, apparatus 600 may further include an external memory 608 (e.g., the system memory or main memory) that can be shared by each chip 602, 604, or 606 through the system/main bus. Although baseband chip 602 is illustrated as a standalone SoC in FIG. 6, it is understood that in one example, baseband chip 602 and radio frequency chip 604 may be integrated as one SoC; in another example, baseband chip 602 and host chip 606 may be integrated as one SoC; in still another example, baseband chip 602, radio frequency chip 604, and host chip 606 may be integrated as one SoC, as described above.

In the uplink, host chip 606 may generate raw data and send it to baseband chip 602 for encoding, modulation, and mapping. Baseband chip 602 may also access the raw data generated by host chip 606 and stored in external memory 608, for example, using the direct memory access (DMA). Baseband chip 602 may first encode (e.g., by source coding and/or channel coding) the raw data and modulate the coded data using any suitable modulation techniques, such as multi-phase pre-shared key (MPSK) modulation or quadrature amplitude modulation (QAM). Baseband chip 602 may perform any other functions, such as symbol or layer mapping, to convert the raw data into a signal that can be used to modulate the carrier frequency for transmission. In the uplink, baseband chip 602 may send the modulated signal to radio frequency chip 604. Radio frequency chip 604, through the transmitter (Tx), may convert the modulated signal in the digital form into analog signals, i.e., radio frequency signals, and perform any suitable front-end radio frequency functions, such as filtering, up-conversion, or sample-rate conversion. Antenna 610 (e.g., an antenna array) may transmit the radio frequency signals provided by the transmitter of radio frequency chip 604. In the uplink, radio frequency chip 604 may implement the method shown in FIG. 4, as well as the systems shown in FIGS. 3 and 5, for example, to calibrate the transmitter characteristics of apparatus 600.

In the downlink, antenna 610 may receive radio frequency signals and pass the radio frequency signals to the receiver (Rx) of radio frequency chip 604. Radio frequency chip 604 may perform any suitable front-end radio frequency functions, such as filtering, down-conversion, or sample-rate conversion, and convert the radio frequency signals into low-frequency digital signals (baseband signals) that can be processed by baseband chip 602. In the downlink, baseband chip 602 may demodulate and decode the baseband signals to extract raw data that can be processed by host chip 606. Baseband chip 602 may perform additional functions, such as error checking, de-mapping, channel estimation, descrambling, etc. The raw data provided by baseband chip 602 may be sent to host chip 606 directly or stored in external memory 608. In the downlink, radio frequency chip 604 may implement the method shown in FIG. 4, as well as the systems shown in FIGS. 3 and 5, for example, to calibrate the receiver characteristics of apparatus 600.

As shown in FIG. 7, a node 700 may include a processor 702, a memory 704, a transceiver 706. In some embodiments, transceiver 706 may implement the method shown in FIG. 4, as well as the systems shown in FIGS. 3 and 5. The components in FIG. 7 are shown as connected to one another by bus 708, but other connection types are also permitted. When node 700 is user equipment 802, additional components may also be included, such as a user interface (UI), sensors, and the like. Similarly, node 700 may be implemented as a blade in a server system when node 700 is configured as core network element 806. Other implementations are also possible.

Transceiver 706 may include any suitable device for sending and/or receiving data. Node 700 may include one or more transceivers, although only one transceiver 706 is shown for simplicity of illustration. An antenna 710 is shown as a possible communication mechanism for node 700. Multiple antennas and/or arrays of antennas may be utilized. Additionally, examples of node 700 may communicate using wired techniques rather than (or in addition to) wireless techniques. For example, network node 804 may communicate wirelessly to user equipment 802 and may communicate by a wired connection (for example, by optical or coaxial cable) to core network element 806. Other communication hardware, such as a network interface card (NIC), may be included as well.

As shown in FIG. 7, node 700 may include processor 702. Although only one processor is shown, it is understood that multiple processors can be included. Processor 702 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 702 may be a hardware device having one or many processing cores. Processor 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Processor 702 may be a baseband chip, such as baseband chip 602 in FIG. 6. Node 700 may also include other processors, not shown, such as a central processing unit of the device, a graphics processor, or the like. Processor 702 may include internal memory (also known as local memory, not shown in FIG. 7) that may serve as memory for L2 data. Processor 702 may include a radio frequency chip, for example, integrated into a baseband chip, or a radio frequency chip may be provided separately. Processor 702 may be configured to operate as a modem of node 700 or may be one element or component of a modem. Other arrangements and configurations are also permitted.

As shown in FIG. 7, node 700 may also include memory 704. Although only one memory is shown, it is understood that multiple memories can be included. Memory 704 can broadly include both memory and storage. For example, memory 704 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 702. Broadly, memory 704 may be embodied by any computer-readable medium, such as a non-transitory computer-readable medium. The memory 704 can be the external memory 608 in FIG. 6. The memory 704 may be shared by processor 702 and other components of node 700, such as the unillustrated graphic processor or central processing unit.

As shown in FIG. 8, wireless network 800 may include a network of nodes, such as a UE 802, a network node 804, and a core network element 806. User equipment 802 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 802 is illustrated as a mobile phone simply by way of illustration and not by way of limitation.

Network node 804 may be a device that communicates with user equipment 802, such as a wireless access point, a base station (BS), a Node B, an enhanced Node B (eNodeB or eNB), a next-generation NodeB (gNodeB or gNB), a cluster master node, or the like. Network node 804 may have a wired connection to user equipment 802, a wireless connection to user equipment 802, or any combination thereof. Network node 804 may be connected to user equipment 802 by multiple connections, and user equipment 802 may be connected to other access nodes in addition to network node 804. Network node 804 may also be connected to other UEs. It is understood that network node 804 is illustrated by a radio tower by way of illustration and not by way of limitation.

Core network element 806 may serve network node 804 and user equipment 802 to provide core network services. Examples of core network element 806 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 806 includes an access and mobility management function (AMF) device, a session management function (SMF) device, or a user plane function (UPF) device, of a core network for the NR system. It is understood that core network element 806 is shown as a set of rack-mounted servers by way of illustration and not by way of limitation.

Core network element 806 may connect with a large network, such as the Internet 808, or another IP network, to communicate packet data over any distance. In this way, data from user equipment 802 may be communicated to other UEs connected to other access points, including, for example, a computer 810 connected to Internet 808, for example, using a wired connection or a wireless connection, or to a tablet 812 wirelessly connected to Internet 808 via a router 814. Thus, computer 810 and tablet 812 provide additional examples of possible UEs, and router 814 provides an example of another possible access node.

A generic example of a rack-mounted server is provided as an illustration of core network element 806. However, there may be multiple elements in the core network including database servers, such as a database 816, and security and authentication servers, such as an authentication server 818. Database 816 may, for example, manage data related to user subscription to network services. A home location register (HLR) is an example of a standardized database of subscriber information for a cellular network. Likewise, authentication server 818 may handle authentication of users, sessions, and so on. In the NR system, an authentication server function (AUSF) device may be the specific entity to perform user equipment authentication. In some embodiments, a single server rack may handle multiple such functions, such that the connections between core network element 806, authentication server 818, and database 816, may be local connections within a single rack.

Each of the elements of FIG. 8 may be considered a node of wireless network 800. More detail regarding the possible implementation of a node is provided by way of example in the description of a node 700 in FIG. 7 above. Node 700 may be configured as user equipment 802, network node 804, or core network element 806 in FIG. 8. Similarly, node 700 may also be configured as computer 810, router 814, tablet 812, database 816, or authentication server 818 in FIG. 8.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 700 in FIG. 7. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, DVD, and floppy disk where disks usually reproduce data magnetically, while discs reproduce data optically with lasers. Combinations of the above should also be included within the scope of computer-readable media.

According to one aspect of the present disclosure, a method for calibrating a transceiver (the transceiver including a transmitter and a receiver) can include controlling the transmitter to send a first transmit signal to the receiver with a delay between an output of the transmitter and an input of the receiver. The method can also include controlling the transmitter to send a second transmit signal to the receiver without the delay between the output of the transmitter and the input of the receiver. The method can further include obtaining compensation coefficients of the transceiver based on the sending of the first transmit signal and the sending of the second transmit signal.

In some embodiments, the method can further include collecting a first received signal of the receiver with respect to the first transmit signal and a second received signal of the receiver with respect to the second transmit signal. Obtaining compensation coefficients of the transceiver based on the sending of the first transmit signal and the sending of the second transmit signal can include obtaining the compensation coefficients of the transceiver based on the first and second received signals.

In some embodiments, the obtaining the compensation coefficients based on the first and second received signals can include extracting a first set of values from the first received signal and a second set of values from the second received signal.

In some embodiments, the method can further include applying the compensation coefficients to the transceiver to correct a quadrature mismatch of the transceiver.

In some embodiments the method can further include controlling the transmitter to send a third transmit signal to the receiver with the delay between the output of the transmitter and the input of the receiver. The method can also include controlling the transmitter to send a fourth transmit signal to the receiver without the delay between the output of the transmitter and the input of the receiver. The method can additionally include obtaining changes to the compensation coefficients of the transceiver based on the sending of the third transmit signal and the sending of the fourth transmit signal.

In some embodiments, the compensation coefficients can be transmitter coefficients and receiver coefficients.

In some embodiments, before controlling the transmitter to send a first transmit signal to the receiver with a delay between an output of the transmitter and an input of the receiver and controlling the transmitter to send a second transmit signal to the receiver without the delay between the output of the transmitter and the input of the receiver, the method can further include bypassing existing compensation coefficients.

According to another aspect of the present disclosure, an apparatus for calibrating a transceiver (the transceiver including a transmitter and a receiver) can include at least one processor and at least one memory including computer program code. The at least one memory and the computer program code can be configured to, with the at least one processor, cause the apparatus at least to control the transmitter, to send a first transmit signal to the receiver with a delay between an output of the transmitter and an input of the receiver. The at least one memory and the computer program code can also be configured to, with the at least one processor, cause the apparatus at least to control the transmitter to send a second transmit signal to the receiver without the delay between the output of the transmitter and the input of the receiver. The at least one memory and the computer program code can further be configured to, with the at least one processor, cause the apparatus at least to obtain compensation coefficients of the transceiver based on the sending of the first transmit signal and the sending of the second transmit signal.

In some embodiments, the at least one memory and the computer program code can be further configured to, with the at least one processor, cause the apparatus at least to collect a first received signal of the receiver with respect to the first transmit signal and a second received signal of the receiver with respect to the second transmit signal. Obtaining compensation coefficients of the transceiver based on the sending of the first transmit signal and the sending of the second transmit signal can include obtaining the compensation coefficients of the transceiver based on the first and second receive signals.

In some embodiments, the obtaining the compensation coefficients based on the first and second received signals can include extracting a first set of values from the first received signal and a second set of values from the second received signal.

In some embodiments, the at least one memory and the computer program code can be further configured to, with the at least one processor, cause the apparatus at least to apply the compensation coefficients to the transceiver to correct a quadrature mismatch of the transceiver.

In some embodiments, the at least one memory and the computer program code can be further configured to, with the at least one processor, cause the apparatus at least to control the transmitter to send a third transmit signal to the receiver with the delay between the output of the transmitter and the input of the receiver. The at least one memory and the computer program code can also be configured to, with the at least one processor, cause the apparatus at least to control the transmitter to send a fourth transmit signal to the receiver without the delay line between the output of the transmitter and the input of the receiver. The at least one memory and the computer program code can additionally be configured to, with the at least one processor, cause the apparatus at least to obtain changes to the compensation coefficients of the transceiver based on the sending the third transmit signal and the sending the fourth transmit signal.

In some embodiments, the compensation coefficients can be transmitter coefficients and receiver coefficients.

In some embodiments, before controlling the transmitter to send the first transmit signal to the receiver with the delay between the output of the transmitter and the input of the receiver and controlling the transmitter to send a second transmit signal to the receiver without the delay between the output of the transmitter and the input of the receiver, the at least one memory and the computer program code can be further configured to, with the at least one processor, cause the apparatus at least to bypass any existing compensation coefficients.

According to yet another aspect of the present disclosure, a non-transitory computer-readable medium can be encoded with instructions that, when executed in hardware, cause a device at least to perform a process for calibration of a transceiver. The transceiver can include a transmitter and a receiver. The process can include controlling the transmitter to send a first transmit signal to the receiver with a delay between an output of the transmitter and an input of the receiver. The process can also include controlling the transmitter to send a second transmit signal to the receiver without the delay between the output of the transmitter and the input of the receiver. The process can further include obtaining compensation coefficients of the transceiver based on the sending of the first transmit signal and the sending of the second transmit signal.

According to an additional aspect of the present disclosure, a system for transceiver calibration can include a transmitter configured to generate a first signal and a second signal and a receiver configured to receive the first signal and the second signal. The system can also include a coefficient extractor configured to extract compensation coefficients based on the first signal and the second signal. The system can further include a compensator configured to compensate for quadrature mismatch based on the extracted compensation coefficients. The system can additionally include a delay line configured to introduce a delay between an output of the transmitter and an input of the receiver. The system can also include a switch configured to bypass the delay line selectively. The system can further include a controller configured to control the transmitter to transmit the first signal when the delay line is bypassed and to transmit the second signal when the delay line is not bypassed.

In some embodiments, the controller can be configured to implement a process. The process can include controlling the switch to bypass the delay line. The process can also include controlling the transmitter to send a first transmit signal to the receiver without a delay between an output of the transmitter and an input of the receiver. The process can further include controlling the switch not to bypass the delay line. The process can additionally include controlling the transmitter to send a second transmit signal to the receiver with the delay between the output of the transmitter and the input of the receiver. The process can also include obtaining compensation coefficients of the transceiver based on the sending of the first transmit signal and the sending of the second transmit signal.

In some embodiments, the process can further include collecting a first received signal of the receiver with respect to the first transmit signal and a second received signal of the receiver with respect to the second transmit signal. Obtaining compensation coefficients of the transceiver based on the sending of the first transmit signal and the sending of the second transmit signal can include obtaining the compensation coefficients of the transceiver based on the first and second received signals.

In some embodiments, the coefficient extractor can be configured to extract a first set of values from the first received signal and a second set of values from the second received signal.

In some embodiments, the process can further include controlling the switch to bypass the delay line. The process can additionally include controlling the transmitter to send a third transmit signal to the receiver without the delay between the output of the transmitter and the input of the receiver. The process can also include controlling the switch not to bypass the delay line. The process can further include controlling the transmitter to send a fourth transmit signal to the receiver with the delay between the output of the transmitter and the input of the receiver. The process can additionally include obtaining changes to the compensation coefficients of the transceiver based on the sending of the third transmit signal and the sending of the fourth transmit signal.

In some embodiments, the compensation coefficients can be transmitter coefficients and receiver coefficients.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for calibrating a transceiver, the transceiver comprising a transmitter and a receiver, the method comprising:
controlling the transmitter to send a first transmit signal to the receiver with a delay between an output of the transmitter and an input of the receiver;
controlling the transmitter to send a second transmit signal to the receiver without the delay between the output of the transmitter and the input of the receiver; and
obtaining compensation coefficients of the transceiver based on the sending of the first transmit signal and the sending of the second transmit signal.

2. The method of claim 1, further comprising:
collecting a first received signal of the receiver with respect to the first transmit signal and a second received signal of the receiver with respect to the second transmit signal,
wherein obtaining compensation coefficients of the transceiver based on the sending of the first transmit signal and the sending of the second transmit signal comprises obtaining the compensation coefficients of the transceiver based on the first and second received signals.

3. The method of claim 2, wherein the obtaining the compensation coefficients based on the first and second received signals comprises extracting a first set of values from the first received signal and a second set of values from the second received signal.

4. The method of claim 1, further comprising:
applying the compensation coefficients to the transceiver to correct a quadrature mismatch of the transceiver.

5. The method of claim 1, further comprising:
controlling the transmitter to send a third transmit signal to the receiver with the delay between the output of the transmitter and the input of the receiver;
controlling the transmitter to send a fourth transmit signal to the receiver without the delay between the output of the transmitter and the input of the receiver; and
obtaining changes to the compensation coefficients of the transceiver based on the sending of the third transmit signal and the sending of the fourth transmit signal.

6. The method of claim 1, wherein the compensation coefficients comprise transmitter coefficients and receiver coefficients.

7. The method of claim 1, wherein before controlling the transmitter to send a first transmit signal to the receiver with a delay between an output of the transmitter and an input of the receiver and controlling the transmitter to send a second transmit signal to the receiver without the delay between the output of the transmitter and the input of the receiver, the method further comprises:
bypassing existing compensation coefficients.

8. An apparatus for calibrating a transceiver, the transceiver comprising a transmitter and a receiver, the apparatus comprising:
at least one processor; and
at least one memory including computer program code, wherein the at least one memory and the computer program code are configured to, with the at least one processor, cause the apparatus at least to:
control the transmitter, to send a first transmit signal to the receiver with a delay between an output of the transmitter and an input of the receiver;
control the transmitter to send a second transmit signal to the receiver without the delay between the output of the transmitter and the input of the receiver; and
obtain compensation coefficients of the transceiver based on the sending of the first transmit signal and the sending of the second transmit signal.

9. The apparatus of claim 8, wherein the at least one memory and the computer program code are further configured to, with the at least one processor, cause the apparatus at least to:
collect a first received signal of the receiver with respect to the first transmit signal and a second received signal of the receiver with respect to the second transmit signal,
wherein obtaining compensation coefficients of the transceiver based on the sending of the first transmit signal and the sending of the second transmit signal comprises obtaining the compensation coefficients of the transceiver based on the first and second receive signals.

10. The apparatus of claim 9, wherein the obtaining the compensation coefficients based on the first and second received signals comprises extracting a first set of values from the first received signal and a second set of values from the second received signal.

11. The apparatus of claim 8, wherein the at least one memory and the computer program code are further configured to, with the at least one processor, cause the apparatus at least to apply the compensation coefficients to the transceiver to correct a quadrature mismatch of the transceiver.

12. The apparatus of claim 8, wherein the at least one memory and the computer program code are further configured to, with the at least one processor, cause the apparatus at least to:
control the transmitter to send a third transmit signal to the receiver with the delay between the output of the transmitter and the input of the receiver;
control the transmitter to send a fourth transmit signal to the receiver without the delay between the output of the transmitter and the input of the receiver; and
obtain changes to the compensation coefficients of the transceiver based on the sending the third transmit signal and the sending the fourth transmit signal.

13. The apparatus of claim 8, wherein the compensation coefficients comprise transmitter coefficients and receiver coefficients.

14. The apparatus of claim 8, wherein before controlling the transmitter to send the first transmit signal to the receiver with the delay between the output of the transmitter and the input of the receiver and controlling the transmitter to send a second transmit signal to the receiver without the delay between the output of the transmitter and the input of the receiver, the at least one memory and the computer program code are further configured to, with the at least one processor, cause the apparatus at least to bypass any existing compensation coefficients.

15. A system for transceiver calibration, comprising:
a transmitter configured to generate a first signal and a second signal;
a receiver configured to receive the first signal and the second signal;
a coefficient extractor configured to extract compensation coefficients based on the first signal and the second signal;
a compensator configured to compensate for quadrature mismatch based on the extracted compensation coefficients;
a delay line configured to introduce a delay between an output of the transmitter and an input of the receiver;
a switch configured to bypass the delay line selectively; and a controller configured to control the transmitter to transmit the first signal when the delay line is bypassed and to transmit the second signal when the delay line is not bypassed.

16. The system of claim 15, wherein the controller is configured to implement a process, the process comprising:
controlling the switch to bypass the delay line;
controlling the transmitter to send a first transmit signal to the receiver without a delay between an output of the transmitter and an input of the receiver;
controlling the switch not to bypass the delay line;
controlling the transmitter to send a second transmit signal to the receiver with the delay between the output of the transmitter and the input of the receiver; and
obtaining compensation coefficients of the transmitter based on the sending of the first transmit signal and the sending of the second transmit signal.

17. The system of claim 16, wherein the process further comprises:
collecting a first received signal of the receiver with respect to the first transmit signal and a second received signal of the receiver with respect to the second transmit signal,
wherein obtaining compensation coefficients of the transceiver based on the sending of the first transmit signal and the sending of the second transmit signal comprises obtaining the compensation coefficients of the transceiver based on the first and second received signals.

18. The system of claim 17, wherein the coefficient extractor is configured to extract a first set of values from the first received signal and a second set of values from the second received signal.

19. The system of claim 16, wherein the process further comprises:
controlling the switch to bypass the delay line;
controlling the transmitter to send a third transmit signal to the receiver without the delay between the output of the transmitter and the input of the receiver;
controlling the switch not to bypass the delay line;
controlling the transmitter to send a fourth transmit signal to the receiver with the delay between the output of the transmitter and the input of the receiver; and
obtaining changes to the compensation coefficients of the transceiver based on the sending of the third transmit signal and the sending of the fourth transmit signal.

20. The system of claim 15, wherein the compensation coefficients comprise transmitter coefficients and receiver coefficients.

* * * * *